(No Model.) 2 Sheets—Sheet 1.
H. C. ROEMER & C. M. KIMBALL.
MEANS FOR PRODUCING OPTICAL ILLUSIONS.
No. 462,510. Patented Nov. 3, 1891.

(No Model.) 2 Sheets—Sheet 2.
H. C. ROEMER & C. M. KIMBALL.
MEANS FOR PRODUCING OPTICAL ILLUSIONS.
No. 462,510. Patented Nov. 3, 1891.
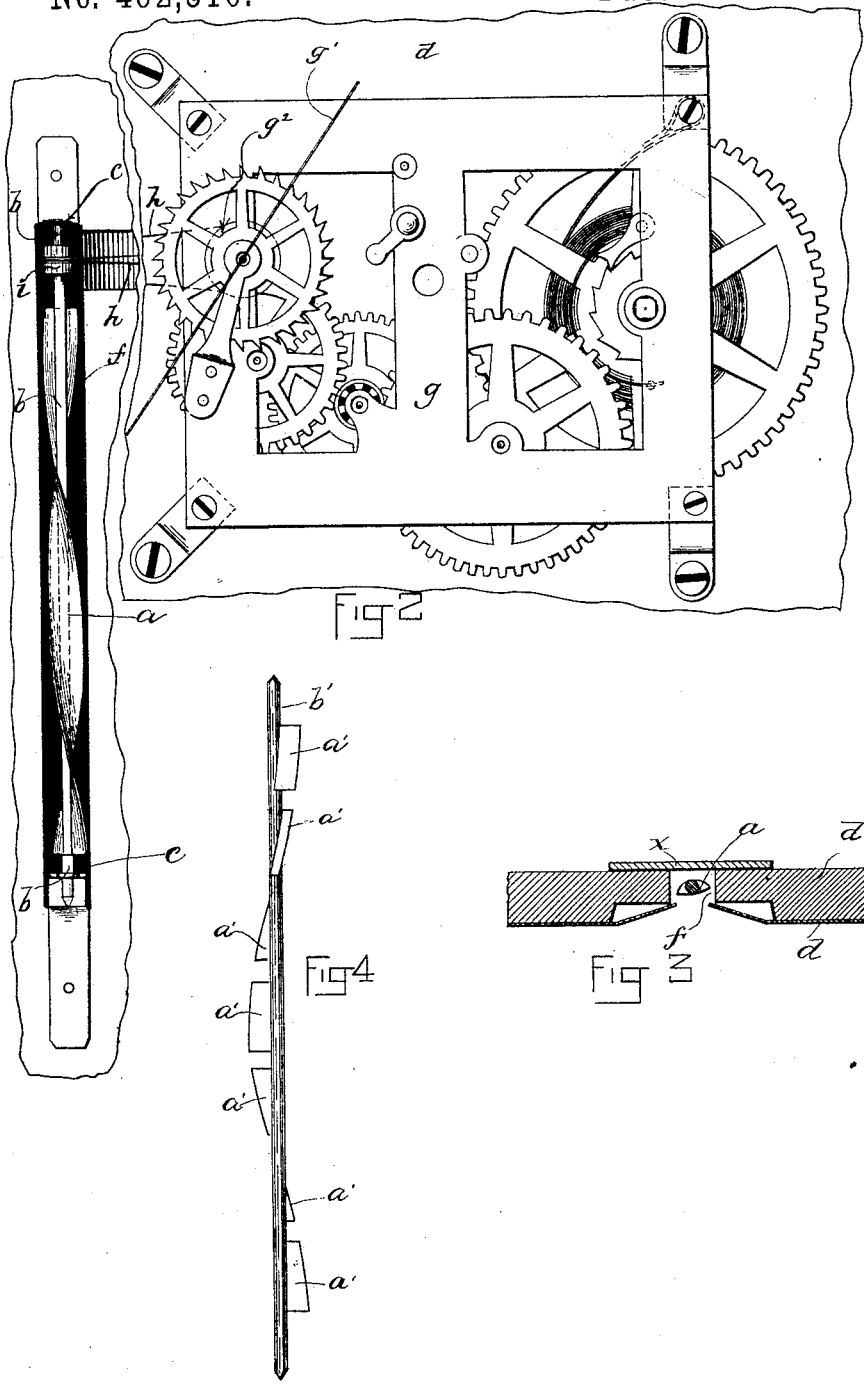

United States Patent Office.

HENRY C. ROEMER AND CHARLES M. KIMBALL, OF TOLEDO, OHIO, ASSIGNORS OF ONE-THIRD TO SAMUEL T. FISK, OF SAME PLACE.

MEANS FOR PRODUCING OPTICAL ILLUSIONS.

SPECIFICATION forming part of Letters Patent No. 462,510, dated November 3, 1891.

Application filed November 6, 1890. Serial No. 370,585. (No model.)

*To all whom it may concern:*

Be it known that we, HENRY C. ROEMER and CHARLES M. KIMBALL, of Toledo, in the county of Lucas and State of Ohio, have invented certain new and useful Improvements in Means for Producing Optical Illusions, of which the following is a specification.

This invention has for its object to provide means for producing upon the eye an effect of continuous progressive movement like that of running water; and it consists, mainly, in a helical strip or blade adapted to rotate in suitable bearings, the axis of rotation being in the direction of the length of the strip or blade, the rotation causing the reflection of light from the convolutions of the blade to move from one end of the blade to the other progressively, and thus produce the desired illusion.

The invention also consists in the combination, with a helical blade or strip adapted to be rotated, of a holder or support having upon its front surface a picture or design and provided with a slot or aperture through which the spiral blade or strip is visible, and means for rotating the blade, the arrangement being such that the optical illusion produced by the rotation of the blade constitutes a feature of the picture.

The invention also consists in certain other improvements incidental to the general purpose of the invention, all of which we will now proceed to describe.

In the accompanying drawings, forming a part of this specification, Figure 1 represents a front view of the holder or support, showing the helical blade in the slot or aperture therein. Fig. 2 represents a rear view of the same. Fig. 3 represents an enlarged section on line 3 3, Fig. 1. Fig. 4 represents a modification of the construction of the helical strip or blade.

The same letters of reference indicate the same parts in all the figures.

In carrying out our invention we provide a helical strip or blade $a$, which is preferably made by twisting a straight strip of sheet metal into a suitable number of convolutions, the blade having the same general form as the blade of an auger. We adapt said strip or blade to be rotated upon an axis extending in the direction of the length of the blade. The blade may have trunnions $b\ b$ projecting from its ends, as shown in Fig. 2, said trunnions being preferably the ends of a continuous rod which extends from end to end of the blade and is soldered to one side thereof. It is obvious, however, that the trunnions may be in separate pieces independently secured to the ends of the blade; or instead of trunnions the ends of the blade may have sockets formed to receive fixed pins or studs, on which the blade may rotate. The trunnions $b\ b$ are here shown as journaled in bearings $c\ c$, affixed to the back of a support or holder $d$, the trunnions being adapted to rotate freely in said bearings. The support or holder $d$ is preferably a flat board having a slot or orifice $f$ cut through it at a suitable point, said slot being of a sufficient size to permit the helical strip or blade $a$ to be viewed through it from the front of the support or holder $d$, the bearings $c\ c$ being at or near the ends of said slot, as shown in Fig. 2.

The blade may be rotated in any suitable way. We have shown in Fig. 2 a motor $g$, attached to the back of the support or holder $d$, said motor being an ordinary clock-train having on one of its arbors a fan-governor $g'$ and a pulley $g^2$, said pulley being connected by a band or belt $h$ with a pulley $i$ on one of the trunnions $b$. Any other suitable means may of course be adopted for rotating the blade without departing from the spirit of our invention.

At the front of the support or holder $d$ is a picture or design, of which the helical blade when in motion constitutes a part. The design here shown includes a representation of a beer-keg, the tap or spigot of which is arranged so that it coincides with the upper end of the slot $f$ and with the helical blade, so that when the blade is in motion it simulates a stream of liquid flowing from the tap into a goblet at the lower end of the slot.

It is obvious that the helical blade may form a feature of a great variety of designs. A series of said strips or blades may be employed arranged side by side to represent a waterfall or running stream. We prefer to distinguish one side of the blade from the other by coloring or tinting one side in contrast to the other; or one side of the blade may have a brightly-polished reflecting-surface and the other a dull surface, this distinction between the sides heightening the effect, although it is not essential, as a reasonably satisfactory effect will be produced if both sides are alike.

We do not limit ourselves in all cases to the use of a blade or strip presenting a continuous helical surface. In Fig. 4 we have shown as a modification a series of sections $a'$, attached to a shaft $b'$, said sections being helically arranged or constituting an interrupted helical surface. Hence we intend by the following claims to cover as broadly as possible within legal bounds any rotating device having a helical reflecting surface or surfaces, either continuous or interrupted, which when in rotary motion will give the effect of progressive motion from end to end of the device.

When the device is used in connection with a picture, it may be arranged at one edge or end of the picture instead of being viewed through a slot cut therein.

To bring out the desired effect we arrange a backing $x$ behind the helical blade, said backing affording a contrast to the tint or color of the blade.

We claim—

1. In an apparatus for producing an optical illusion, the combination of a helical blade, bearings supporting and permitting the rotation thereof, the helical surface of said blade extending in the direction of its axis, whereby when the blade is rotated it is caused to represent a stream of liquid, and a backing behind the blade to afford a contrast to the color of the blade, as set forth.

2. The combination of a holder or support having a slot or aperture, a helical strip or blade supported by bearings on the holder and visible through or in the said slot, and means for rotating said blade, as set forth.

3. The combination of a holder or support having a picture or design on its front surface and a slot or aperture in said surface, a rotary helical strip or blade supported by bearings on said holder, and a motor on the back of the holder to rotate said strip or blade, as set forth.

In testimony whereof we have signed our names to this specification, in the presence of two subscribing witnesses, this 27th day of October, A. D. 1890.

HENRY C. ROEMER.
    CHARLES M. KIMBALL.

Witnesses:
    G. N. MERRILL,
    ROBERT MEREDETH.